United States Patent
Choi et al.

(10) Patent No.: US 10,075,989 B2
(45) Date of Patent: Sep. 11, 2018

(54) NETWORK SYSTEM AND NETWORK CONNECTING METHOD

(71) Applicants: Kee Hyun Choi, Gyeonggi-do (KR); Choon Sung Nam, Seoul (KR)

(72) Inventors: Kee Hyun Choi, Gyeonggi-do (KR); Choon Sung Nam, Seoul (KR)

( * ) Notice: Subject to any disclaimer, the term of this patent is extended or adjusted under 35 U.S.C. 154(b) by 142 days.

(21) Appl. No.: 15/079,347

(22) Filed: Mar. 24, 2016

(65) Prior Publication Data

US 2016/0286585 A1  Sep. 29, 2016

(30) Foreign Application Priority Data

Mar. 27, 2015 (KR) ........................ 10-2015-0043455

(51) Int. Cl.
| | |
|---|---|
| H04W 4/00 | (2018.01) |
| H04W 76/11 | (2018.01) |
| H04W 76/02 | (2009.01) |
| H04W 16/28 | (2009.01) |
| H04W 12/06 | (2009.01) |
| H04W 4/80 | (2018.01) |
| H04W 84/18 | (2009.01) |

(52) U.S. Cl.
CPC ............ *H04W 76/11* (2018.02); *H04W 4/008* (2013.01); *H04W 4/80* (2018.02); *H04W 12/06* (2013.01); *H04W 16/28* (2013.01); *H04W 76/021* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 9,710,682 | B2 * | 7/2017 | Butler | ............... G06K 7/10198 |
| 2004/0255034 | A1 * | 12/2004 | Choi | ...................... H04L 29/06 |
| | | | | 709/229 |
| 2016/0048712 | A1 * | 2/2016 | Butler | ............... H04L 67/1097 |
| | | | | 340/10.51 |

FOREIGN PATENT DOCUMENTS

| | | |
|---|---|---|
| KR | 10-2006-0044346 A | 5/2006 |
| KR | 10-2009-0030629 A | 3/2009 |
| KR | 10-2011-0053992 A | 5/2011 |
| KR | 10-2015-0088158 A | 7/2015 |

* cited by examiner

*Primary Examiner* — Minh-Trang Nguyen
(74) *Attorney, Agent, or Firm* — Greer, Burns & Crain, Ltd.

(57) ABSTRACT

A network connecting method includes: storing, by a server, a data table that matches a first information on an access point (AP) with a second information related to a beacon, wherein the access point (AP) and the beacon are configured to perform short-range wireless communications of different standards; transmitting, by the beacon, a beacon message on basis of an authentication information; obtaining, by a terminal, the authentication information based on the beacon message; transmitting, by the terminal, a request message including the authentication information to the server through long-range wireless communication; obtaining, by the server, based on the data table, an access information corresponding to the authentication information transmitted from the terminal; transmitting a response message including the access information to the terminal; and accessing, by the terminal that receives the response message, the AP by using the access information.

18 Claims, 7 Drawing Sheets

NETWORK SYSTEM AND NETWORK CONNECTING METHOD

CROSS-REFERENCE TO RELATED PATENT APPLICATION

This application claims the benefit of Korean Patent Application No. 10-2015-0043455 filed on Mar. 27, 2015, in the Korean Intellectual Property Office, the disclosure of which is incorporated herein in its entirety by reference.

BACKGROUND OF THE INVENTION

1. Field of the Invention

The present disclosure relates to a network connecting method, and more particularly, to a network connecting method for allowing a terminal to automatically connect to a network by transmitting information necessary for network connection to the terminal through short-range wireless communication.

2. Description of the Related Art

As demand for electronic devices using wireless internet is increased recently, shops or public places increasingly provide communication network such as Wi-Fi to users as service.

In order to use communication network such as Wi-Fi in stores and public places, users are typically required to inquire of an administrator about the access ID or password or obtain the access ID or password through public information.

However, in such a case, when an administrator is absent, users cannot use communication network and the access ID or password is shared with other people. Therefore, unauthorized use of communication network may occur.

SUMMARY OF THE INVENTION

The present disclosure provides a network connecting method for allowing a terminal to automatically connect to network by obtaining information necessary for network connection through short-range wireless communication.

According to an embodiment of the present invention, a network connecting method may include: storing, by a server, a data table that matches a first information on an access point (AP) with a second information related to a beacon, wherein the access point (AP) and the beacon are configured to perform short-range wireless communications of different standards; transmitting, by the beacon, a beacon message on basis of an authentication information; obtaining, by a terminal, the authentication information based on the beacon message; transmitting, by the terminal, a request message including the authentication information to the server through long-range wireless communication; obtaining, by the server, based on the data table, an access information corresponding to the authentication information transmitted from the terminal; transmitting a response message including the access information to the terminal; and accessing, by the terminal that receives the response message, the AP by using the access information.

According to another aspect of the present invention, a network connecting method may include: setting access information on an AP connected based on the web of things; transmitting the access information to the AP; registering the access information; transmitting, by the AP, the access information to the beacon through short-range wireless communication having the same standard as a beacon; creating, by the beacon, a beacon message on the basis of the access information and transmitting the beacon message through a short-range communication method; obtaining, by the terminal, the access information from the beacon message; and transmitting, by the terminal, the access information to the AP to access to the AP.

According to another aspect of the present invention, provided is a non-transitory computer readable recording medium having a program for implementing the network connecting method.

According to another aspect of the present invention, a network system may include: a beacon configured to create a beacon message and transmit the created beacon message using a short-range communication method, wherein the beacon message includes an authentication information; a server configured to register access information transmitted from an AP, receive an authentication information that a terminal obtains from the beacon message, and transmit the access information corresponding to the received authentication information to the terminal; and an AP configured to transmit the access information to the server, determine a validity of the access information transmitted from the terminal, and when the access information is valid, allocate an IP that the terminal is to access in order to transmit IP information to the terminal.

According to another aspect of the present invention, a network system may include:

a beacon configured to create a beacon on the basis of an access information received from an AP and transmit the created beacon message using a short-range communication method; and an AP configured to receive the access information from a web of things to register the access information, transmit the access information to the beacon, when a terminal requests connection by transmitting the access information obtained from the beacon message, determine a validity of the access information, and when the access information is valid, allocate an IP that the terminal is to access to transmit IP information to the terminal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The objects, features, and advantages of the present invention become more apparent from the following detailed description with reference to the accompanying drawings. However, various modifications are possible in various embodiments of the present invention and thus, specific embodiments are illustrated in drawings and related detailed descriptions are listed.

In the accompanying drawings, the thicknesses of layers and areas are exaggerated for clarity and also, it will be understood that when an element or a layer is referred to as being "on" another element or layer, it may be directly on the other element or intervening elements may also be present. The same reference numerals denote the same elements in principle throughout the specification. Additionally, like reference numerals refer to like elements.

Additionally, detailed descriptions of well-known functions or configurations will be omitted since they would obscure the present invention in unnecessary detail. Additionally, numbers (for example, first and second) used in the description of this specification are just identification symbols for distinguishing one component from another component.

Hereinafter, an electronic device according to the present invention will be described in detail with reference to the accompanying drawings. The suffixes "module" and "unit" for components used in the description below are assigned or mixed in consideration of easiness in writing the specification and do not have distinctive meanings or roles by themselves.

According to one aspect of the present invention, a network connecting method may include: storing, by a server, a data table that matches a first information on an access point (AP) with a second information related to a beacon, wherein the access point (AP) and the beacon are configured to perform short-range wireless communications of different standards; transmitting, by the beacon, a beacon message on basis of an authentication information; obtaining, by a terminal, the authentication information based on the beacon message; transmitting, by the terminal, a request message including the authentication information to the server through long-range wireless communication; obtaining, by the server, based on the data table, an access information corresponding to the authentication information transmitted from the terminal; transmitting a response message including the access information to the terminal; and accessing, by the terminal that receives the response message, the AP by using the access information.

Additionally, the beacon may transmit the beacon message to the terminal connected to an ad-hoc type network.

Additionally, the beacon transmits the beacon message through one way communication.

Additionally, the beacon may obtain, as the authentication information, a random number formed of at least one of a string and a number, which are generated based on the access information, from a stored program.

Additionally, the server may determine whether the beacon corresponding to the authentication information received from the terminal and when the beacon corresponding to the authentication information, search for the access information corresponding to the AP which stores matching the beacon.

Additionally, the access information may include at least one of a Service Set Identifier (SSID) for identifying the AP and a password.

Additionally, the short-range wireless communication may be at least one of Bluetooth, Bluetooth LE (BTLE), NFC, ZigBee, visible light communication, Wi-fi and RFID.

Additionally, the AP may perform Wi-Fi and the beacon may perform short-range wireless communication of at least one of Bluetooth, BTLE, NFC, ZigBee, visible light communication, and RFID.

Additionally, the beacon may create and transmit the beacon message in a data structure used for BTLE.

Additionally, the beacon may modify a capacity division of a data structure used for BTLE to crate and transmit the beacon message.

According to another aspect of the present invention, a network connecting method may include: setting access information on an AP connected based on the web of things; transmitting the access information to the AP; registering the access information; transmitting, by the AP, the access information to the beacon through short-range wireless communication having the same standard as a beacon; creating, by the beacon, a beacon message on the basis of the access information and transmitting the beacon message through a short-range communication method; obtaining, by the terminal, the access information from the beacon message; and transmitting, by the terminal, the access information to the AP to access to the AP.

According to another aspect of the present invention, provided is a non-transitory computer readable recording medium having a program for implementing the network connecting method.

According to another aspect of the present invention, a network system may include: a beacon configured to create a beacon message and transmit the created beacon message using a short-range communication method, wherein the beacon message includes an authentication information; a server configured to register access information transmitted from an AP, receive an authentication information that a terminal obtains from the beacon message, and transmit the access information corresponding to the received authentication information to the terminal; and an AP configured to transmit the access information to the server, determine a validity of the access information transmitted from the terminal, and when the access information is valid, allocate an IP that the terminal is to access in order to transmit IP information to the terminal.

Additionally, the server may receive a Mac address of terminal and register the Mac address.

Additionally, the server may store at least one of a date and time of registering the MAC address and a date and time of transmitting the access information to the terminal.

Additionally, when a predetermined time elapses after the date and time of registering the MAC address of the terminal and the date and time of transmitting the access information to the terminal, the server may transmit the MAC address of the terminal to the AP.

Additionally, the AP may receive the MAC address from the server and release a connection to the terminal corresponding to the received MAC address.

According to another aspect of the present invention, a network system may include: a beacon configured to create a beacon on the basis of an access information received from an AP and transmit the created beacon message using a short-range communication method; and an AP configured to receive the access information from a web of things to register the access information, transmit the access information to the beacon, when a terminal requests connection by transmitting the access information obtained from the beacon message, determine a validity of the access information, and when the access information is valid, allocate an IP that the terminal is to access to transmit IP information to the terminal.

In this specification, a beacon may be a device for transmitting data through a short-range communication method such as Bluetooth, Bluetooth LE (BTLE), NFC, ZigBee, visible light communication, and RFID. Additionally, an access point (AP) may be a wireless communication hub for transmitting/receiving wireless data traffic such as Wi-Fi or a device or wireless router functioning as a base station. A terminal, as a device for transmitting/receiving data to/from an AP or other terminals through a wireless communication method such as Wideband-CDMA (W-CDMA), Long-Term Evolution (LTE), and Wi-Fi, for example, may be a portable mobile terminal such as a mobile phone, a smartphone, a laptop computer, a digital broadcast terminal, a Personal Digital Assistant (PDA), a Portable Multimedia Player (PMP), and a navigation.

Hereinafter, for convenience of description, an AP using a BTLE based short-range communication device, a smartphone terminal, and Wi-Fi is described as an example.

Figure 1:
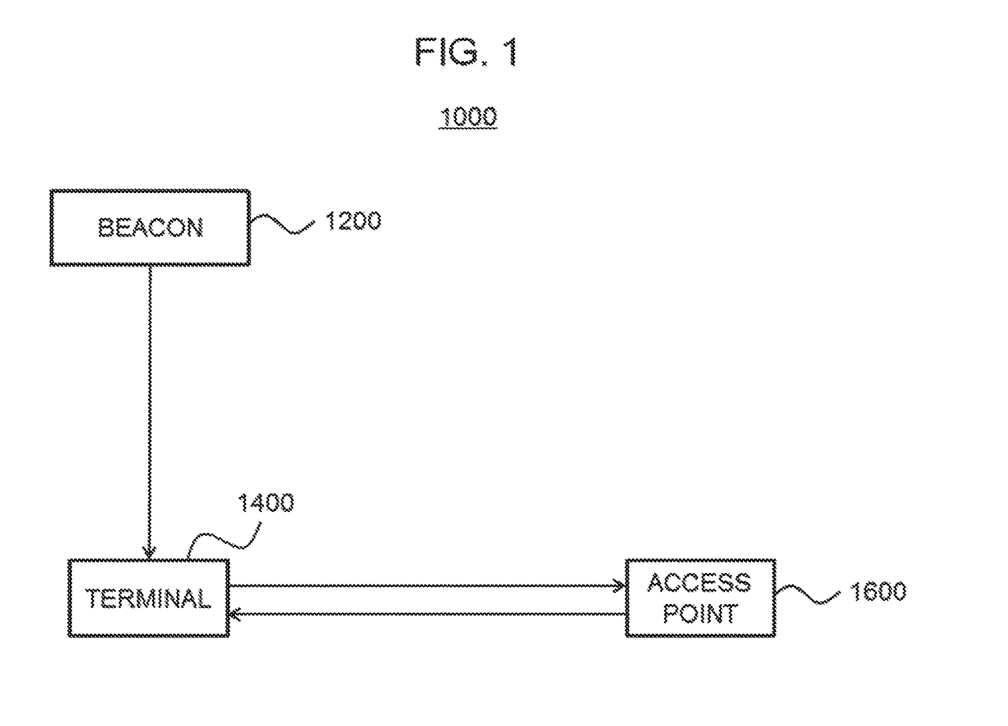
FIG. 1 is a view illustrating a configuration of a network system according to a first embodiment of the present invention.

FIG. 1 is a view illustrating a configuration of a network system 1000 according to a first embodiment of the present invention.

Referring to FIG. 1, the network system 1000 may include a beacon 1200, a terminal 1400, and an AP 1600. The beacon 1200 may transmit/receive a beacon message through a first short-range communication method. The terminal 1400 may request communication connection from the AP 1600 on the basis of the beacon message. The AP 1600 may be connected to the terminal 1500 that requests connection through a second short-range communication method to allow a communication network connected to the AP 1600 to be connected to the terminal 1400. Herein, the short-range communication method may be at least one of Bluetooth, BTLE, NFC, ZigBee, visible light communication, Wi-fi and RFID. Furthermore, the first short-range wireless communication method may be at least one of Bluetooth, BTLE, NFC, ZigBee, visible light communication, and RFID, and the second wireless communication method may be Wi-Fi.

The beacon 1200 may create a beacon message based on access information and transmit the created beacon message to the outside. Herein, the access information may include at least one of an AP identifier such as a Service Set Identifier (SSID) for identifying the AP 1600 and a password corresponding to the AP identifier.

The beacon 1200 may receive access information from a network administrator that manages the network system 1000 and register the received access information. Herein, the access information registration may store access information in an additional storage unit (not shown) in the beacon 1200 and the beacon 1200 may store the access information on the basis of an AP identifier, a registration date, and an administrator identifier for identifying a network administrator.

The beacon 1200 may create a beacon message according to a data structure on the basis of the registered access information.

Specific descriptions for the beacon message creation and data structure of the beacon 1200 are made below with reference to FIGS. 2 and 3.

The beacon 1200 may transmit a created beacon message to the outside.

For example, the beacon 1200 may transmit a created beacon message to the terminal 1400 connected through an Ad-hoc network method and for another example, transmit a beacon message to the outside without connection (for example, pairing) to an additional terminal 1400. That is, the beacon 1200 may transmit a beacon message through bidirectional communication and also transmit a beacon message through one directional communication according to selection.

The beacon 1200 may transmit a beacon message through a first short-range wireless communication method, and herein, the first short-range wireless communication method, for example, may be a short-range wireless communication method such as Bluetooth, BTLE, NFC, ZigBee, visible light communication, and RFID.

The terminal 1400 may receive a beacon message transmitted from the beacon 1200, and obtain access information from the received beacon message. Additionally, the terminal 1400 may request connection from the AP 1600 in the access information obtained from the beacon message.

The terminal 1400 may include a short-range wireless communication unit (not shown) for receiving a beacon message from the beacon 1200 and a wireless communication unit (not shown) for connecting to the AP 1600.

When the connection request to the AP 1600 is accepted, the terminal 1400 may access the AP 1600 through an IP that the AP 1600 allocates to the terminal 1400, and the terminal 1400 accesses the AP 1600 through the accessed IP to be connected to a communication network connected to the AP 1600.

The AP 1600 may receive a connection request from the terminal 1400 and then determine whether connection information transmitted when the terminal 1400 requests the connection is valid. When the connection information is valid, the AP 1600 may allocate an IP that the terminal 1400 is to access so as to connect the terminal 1400 to a communication network connected to the AP 1600. For example, an AP may be a device for functioning as a wireless communication hub or a base station, which transmits/receives wireless data traffic by connecting the terminal 1400 to a communication network connected to the AP.

The AP 1600 may be set with access information including an AP identifier such as an SSID for identifying the AP 1600 and a password corresponding to the AP identifier. The AP 1600 may set access information by obtaining at least one of an AP identifier and a password through a program pre-stored in a storage unit (not shown) of the AP 1600, or set access information by receiving at least one of an AP identifier and a password from a network administrator.

When receiving a connection request from the terminal 1400, the AP 1600 may compare access information transmitted when the terminal 1400 requests the connection with access information set in the AP 1600 in order to determine whether the access information transmitted from the terminal 1400 is valid. When the access information transmitted from the terminal 1400 is valid based on a determination result, the AP 1600 may allocate an IP that the terminal 1400 is to access in order to transmit information on the IP to the terminal 1400 and the terminal 1400 may access the AP 1600 through the IP allocated to the terminal 1400 in order to allow the terminal 1400 to connect to a communication network connected to the AP 1600.

Figure 2:
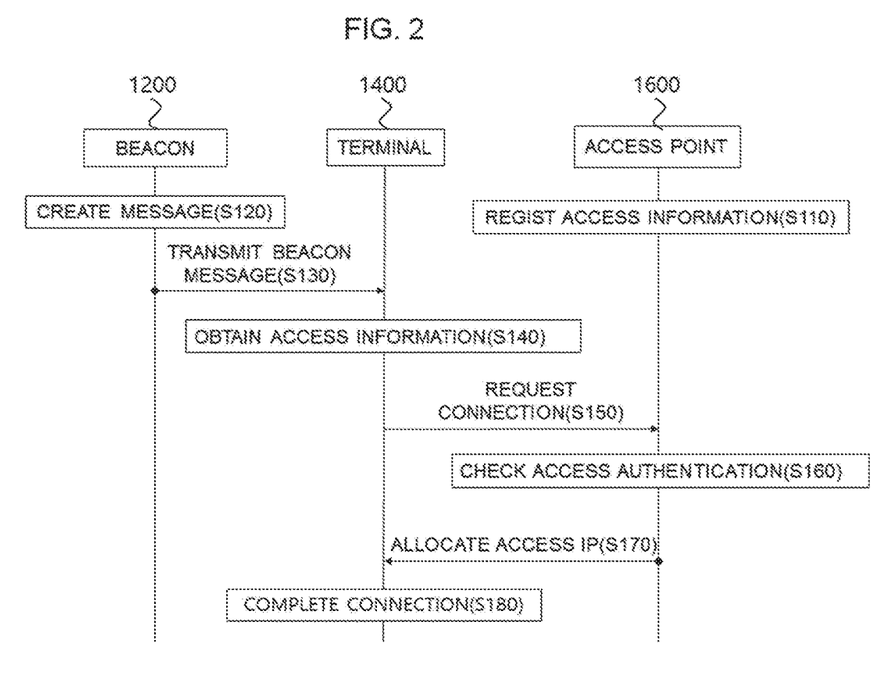
FIG. 2 is a flowchart illustrating a network connecting method according to a first embodiment of the present invention.

FIG. 2 is a flowchart illustrating a network connecting method according to a first embodiment of the present invention.

Referring to FIG. 2, the network connecting method may include setting access information in operation S110, creating a beacon message in operation S120, transmitting a beacon message in operation S130, obtaining access information in operation S140, requesting a connection in operation S150, checking an access authentication for access information in operation S160, allocating an access IP in operation S170, and completing the connection in operation S180.

The AP 1600 may receive and set access information from a network administrator in operation S110.

The AP 1600 may store access information inputted from a network administrator in a storage unit of the AP 1600 and update an AP name to be provided to the terminal 1400 based on the inputted access information. Additionally, the AP 1600 may update a password that is the basis for validity determination of access information on the basis of the inputted access information.

For example, a network administrator may access a web address through which an access information input for the AP 1600 is available and input access information for the AP 1600. The AP 1600 may store access information inputted from the web address to set the access information for the AP 1600.

The beacon 1200 may receive access information from a network administrator and create a beacon message on the basis of the received access information in operation S120.

The beacon 1200 may store access information received from a network administrator in a storage unit (not shown) of the beacon 120 and create a beacon message on the basis of the received access information. The beacon 1200 may create a beacon message in a predetermined data structure on the basis of access information.

Figure 3:
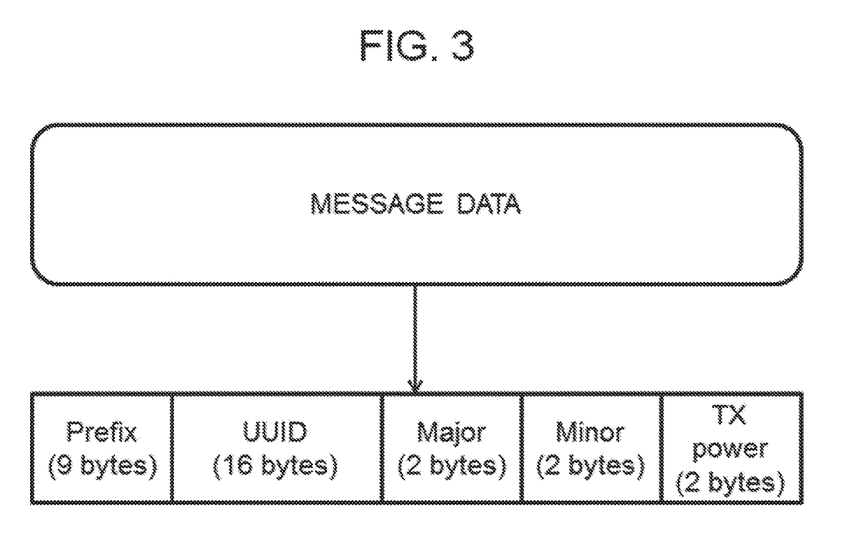
FIG. 3 is a view illustrating a data structure of a beacon message according to a first embodiment of the present invention.

FIG. 3 is a view illustrating a data structure of a beacon message according to a first embodiment of the present invention.

The data structure of FIG. 3, for convenience of description, refers to a data structure used in BTLE and a data structure of a beacon message may vary according to a communication method of the beacon 1200 or a user selection. Additionally, the name of the data structure shown in FIG. 3 may vary also according to a communication method or a user selection.

Referring to FIG. 3, the data structure of the beacon message may include Prefix, UUID, Major, Minor, and TX power.

Prefix may represent that the beacon 1200 transmits a communication packet by using BTLE and UUID may be used for identifying a company for providing service such as a store name. Additionally, Major may include an AP identifier and Minor may include a password. Tx power may include a transmission power of the beacon 1200 in order to allow the terminal 1400 to identify a distance to the beacon 1200.

For example, the beacon 1200 may create a UUID to correspond to a store name, Major to correspond to an AP identifier, and Minor to correspond to a password.

The beacon 1200 may create a beacon message by modifying an existing data structure.

For example, the beacon 1200 may create a beacon message by changing the data size of UUID, Major, and Minor. In more detail, for example, as shown in FIG. 3, when UUID is 16 bytes and each of Major and Minor is 2 bytes, a beacon message may be created by changing UUID in 8 bytes and each of Major and Minor in 6 bytes. That is, the beacon 1200 may create a beacon message by modifying a divided capacity of a data structure.

The beacon 1200 may create a beacon message to correspond to an AP identifier and a password over a plurality of data positions.

For example, the beacon 1200 may create a beacon message to correspond to an AP identifier and a password by using data that is not limited to positions and continuous over UUID, Major, and Minor. In more detail, for example, the beacon 1200 may create the data of "B9 00 7F 30 F4 F8 42 61 AF F9 25 55 6A 57 FE 6D 00 49 11 10" corresponding to an AP identifier and a password with the 20-bytes size of UUID, Major, and Minor.

The beacon 1200 may transmit the created beacon message to the outside in operation S130.

The beacon 1200 may transmit a created beacon message to the outside through a first short-range communication method, transmit a created beacon message to a connected terminal 1400 through an Ad-hoc network method, or transmit a created beacon message to the outside without a connection (for example, pairing) to the terminal 1400. That is, the beacon 1200 may transmit a beacon message, which is created by only the terminal 1400 in a connected network, through a first short-range communication method, and transmit a created beacon message to the outside in order to allow a plurality of unspecified terminals 1400 to receive the beacon message.

Although it is described above that the beacon 1200 creates a beacon message on the basis of an AP identifier and a password, the beacon 1200 may create a beacon message on the basis of only a password. For example, the beacon 1200 may create a UUID to correspond to a store name and create Major and Minor to correspond to a password.

The terminal 1400 may obtain access information from the received beacon message in operation S140.

The terminal 1400 may check a data structure of the received beacon message and obtain an AP identifier and a password from the received beacon message.

The terminal 1400 may check the data structure of the received beacon message through a program pre-stored in a storage unit of the terminal 1400 and obtain access information such as an AP identifier and a password from the received beacon message.

The terminal 1400 may transmit the access information to the AP 1600 in order to request connection in operation S150.

The terminal 1400 may transmit the access information extracted from the received beacon message to the AP 1600 in order to request connection.

The AP 1600 may determine the validity of the access information transmitted from the terminal 1400 in order to authenticate it.

The AP 1600 may receive the access information from the terminal 1400 and determine the validity of the received access information. Herein, the validity determination of the received access information is to determine whether the received access information is identical to access information pre-stored in the AP 1600. When the received access information is identical to the access information pre-stored in the AP 1600, it is determined that the received access information is valid and when the received access information is not identical to the access information pre-stored in the AP 1600, it is determined that the received access information is not valid.

When the received access information is not valid based on a validity determination result, the AP 1600 may notify the terminal 1400 that the transmitted access information is not valid.

The AP 1600 may allocate an IP that the terminal 1400 is to access in operation S170.

When the received access information is valid based on a validity determination result, the AP 1600 may allocate an IP that the terminal 1400 is to access and transmit information corresponding to an access IP allocated to the terminal 1400, to the terminal 1400.

The terminal 1400 may access the allocated IP in order to connect to a communication network connected to the AP 1600 in operation S180.

The terminal 1400 may access the allocated IP in order to connect to a communication network connected to the AP 1600 and transmit/receive data.

Figure 4:
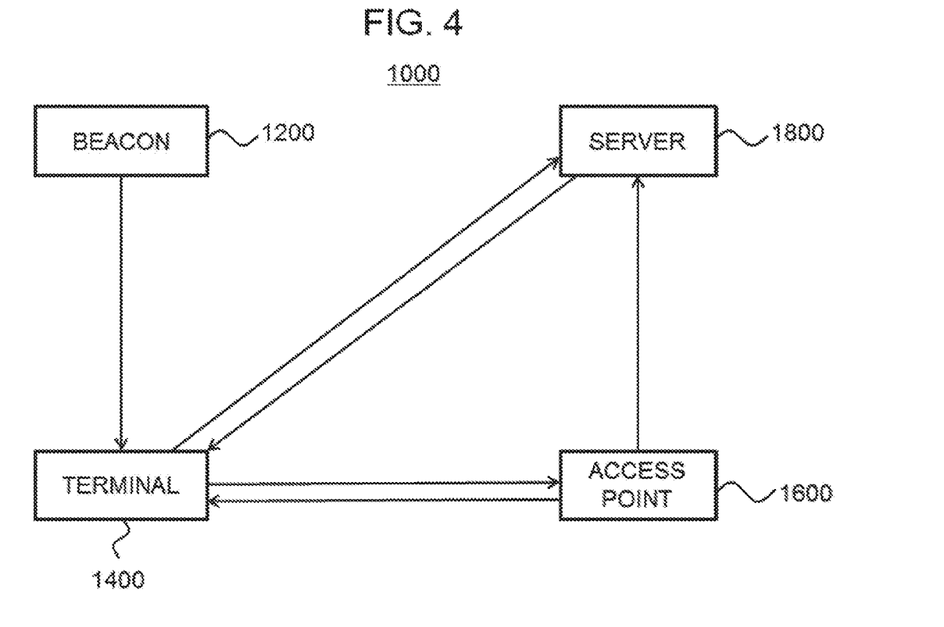
FIG. 4 is a view illustrating a configuration of a network system according to a second embodiment of the present invention.

Hereinafter, a network system 10000 according to a second embodiment of the present invention is described.

Compared to the network system 1000 according to the first embodiment of the present invention, the network system 1000 according to the second embodiment of the present invention further includes a server 1800 and operations of the beacon message transmission of the beacon 1200 and the connection request of the terminal 1400 are identical. Accordingly, in describing the network system 1000 according to the second embodiment of the present invention, like reference numerals may refer to like elements and overlapping contents may be omitted with respect to the network system 1000 of the first embodiment of the present invention.

FIG. 4 is a view illustrating a configuration of a network system 1000 according to a second embodiment of the present invention.

Referring to FIG. 4, the network system 1000 according to the second embodiment of the present invention may include a beacon 1200, a terminal 1400, an AP 1600, and a server 1800.

The beacon 1200 may transmit a beacon message to the outside and the terminal 1400 may extract authentication information from the beacon message and request access information from the server 1800 and transmit the access information received from the server 1800 to the AP 1600 in order to request connection. Additionally, the AP 1600 may connect the terminal 1400 that requests connection to a communication network and the server 1800 may receive authentication information from the terminal 1400 and transmit access information corresponding to the received authentication information to the terminal 1400.

The beacon 1200 may create a beacon message based on authentication information and transmit the created beacon message to the outside. Herein, the authentication information may be a random number corresponding to an AP identifier such as an SSID for identifying the AP 1600 and a password and may be data identical to the access information. Additionally, the authentication information may be data corresponding to the name of the beacon 1200 or data including at least one of a predetermined string and number that the beacon 1200 includes in a beacon message and transmits.

The beacon 1200 may receive authentication information from a network administrator that manages the network system 1000 and register the received authentication information. Herein, the authentication information registration may store authentication information in a storage unit (not shown) of the beacon 1200. Additionally, the beacon 1200 may obtain authentication information from a program stored in the storage unit of the beacon 1200. For example, the beacon 1200 may obtain, as authentication information, a random number formed of at least one of a string and a number, which are generated randomly by a program stored in the storage unit of the beacon 1200. For another example, the beacon 1200 may obtain, as authentication information, a random number formed of at least one of a string and a number, which are generated based on access information by a program stored in the storage unit of the beacon 1200.

The beacon 1200 may create a beacon message according to a data structure on the basis of the registered authentication information.

The beacon 1200 may transmit the created beacon message to the outside.

The terminal 1400 may receive a beacon message transmitted from the beacon 1200, and obtain authentication information from the received beacon message. The terminal 1400 may transmit the authentication information and a MAC address to the server 1800 in order to request access information and transmit the access information received from the server 1800, to the AP 1600 in order to request connection.

The terminal 1400 may include a first short-range communication unit (not shown) for receiving a beacon message from the beacon 1200 in order to receive a beacon message transmitted from the beacon 1200, a long-range wireless communication unit (not shown) for connecting to a communication network provided from a commercial communication network carrier by using a long-range wireless communication such as 3G and LTE, and a second wireless communication unit (not shown) for connecting to the AP 1600 by using a second short-range wireless communication.

When the connection request to the AP 1600 is accepted, the terminal 1400 may access the AP 1600 through an IP that the AP 1600 allocates to the terminal 1400, and the terminal 1400 may be connected to the AP 1600 through the accessed IP to connect to a communication network connected to the AP 1600.

The AP 1600 may transmit an IP address and access information to the server 1800 and receive a connection request from the terminal 1400. After determining whether connection information transmitted when the terminal 1400 requests the connection is valid, if the connection information is valid, the AP 1600 may allocate an IP that the terminal 1400 is to access so as to connect the terminal 1400 to a communication network connected to the AP 1600. Herein, the IP address that the AP 1600 transmits to the server 1800, for example, may be an IP address assigned to the AP 1600.

The AP 1600 may be set with access information including an AP identifier such as an SSID for identifying the AP 1600 and a password corresponding to the AP identifier. The AP 1600 may set access information by obtaining at least one of an AP identifier and a password through a program pre-stored in a storage unit, or set access information by receiving at least one of an AP identifier and a password from a network administrator.

When receiving a connection request from the terminal 1400, the AP 1600 may compare access information transmitted when the terminal 1400 requests the connection with access information set in the AP 1600 in order to determine whether the access information transmitted from the terminal 1400 is valid. When the access information transmitted from the terminal 1400 is valid based on a determination result, the AP 1600 may allocate an IP that the terminal 1400 is to access in order to transmit information on the IP to the terminal 1400 and connect the terminal 1400 to a communication network connected to the AP 1600 through the IP allocated to the terminal 1400.

The AP 1600 may receive the MAC address of the terminal 1400, which exceeds a usage time, from the server 1800, and release a connection to the terminal 1400 corresponding to the MAC address.

The server 1800 may receive an IP address and access information from the AP 1600 in order to register them and match the beacon 1200 and the AP 1600 to register them. For example, the server 1800 may match access information transmitted from the AP 1600 and authentication information transmitted from the beacon 1200 in order to store them.

The server 1800 may receive authentication information and an MAC address from the terminal 1400.

The server 1800 may register the MAC address received from the terminal 1400 and transmit access information, which is matched to authentication information received from the terminal 1400 and stored, to the terminal 1400.

The server 1800 may store at least one of a date and time of registering the MAC address received from the terminal 1400 and a date and time of transmitting access information to the terminal 1400, and when a predetermined time elapses after the date and time of registering the MAC address received from the terminal 1400 of the date and time of transmitting access information to the terminal 1400, transmit the MAC address received from the terminal 1400 to the AP 1800 in order to release a connection to the terminal 1400 corresponding to the MAC address received by the AP 1800. That is, the server 1800 may transmit the MAC address of the terminal 1400, which exceeds a usage time, to the AP 1600.

For example, a server may be implemented with a smartphone or a tablet in addition to computer hardware operated by a server program.

Figure 5:
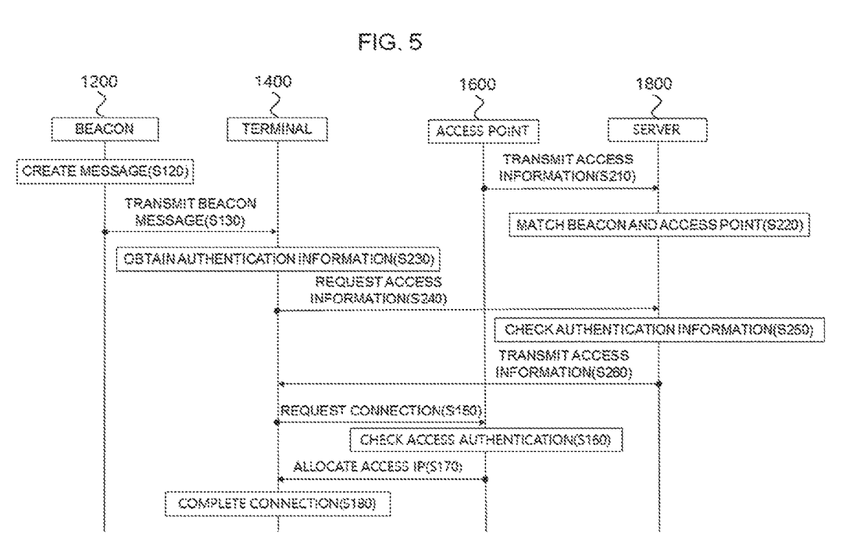
FIG. 5 is a flowchart illustrating a network connecting method according to a second embodiment of the present invention.

FIG. 5 is a flowchart illustrating a network connecting method according to a second embodiment of the present invention.

Referring to FIG. 5, the network connecting method according to the second embodiment of the present invention may include delivering access information in operation S210, matching and registering the beacon 1200 and the AP 1600 in operation S220, creating a beacon message in operation S120, transmitting the beacon message in operation S130, obtaining authentication information in operation S230, requesting access information in operation S240, checking the authentication information in operation S250, transmitting the access information in operation S260, requesting connection in operation S150, checking access authentication for access information in operation S160, allocating an access IP in operation S170, and completing the connection in operation S180.

The AP 1600 may transmit access information and an IP address to the server 1800 in operation S210.

The AP 1600 may be set with access information including an AP identifier such as an SSID for identifying the AP 1600 and a password corresponding to the AP identifier and the AP 1600 may transmit set access information and the IP address of the AP 1600 to the server 1800.

The server 1800 may match and register the beacon 1200 and the AP 1600 in operation S220.

The server 1800 may receive set access information and the IP address of the AP 1600 from the AP 1600 and match and register the beacon 1200 and the AP 1600. Herein, the server 1800 may receive and register the beacon 1200, which is to be matched to the AP 1600 and registered, from a network administrator. For example, the server 1800 may receive a beacon 1200, which is to be matched to the AP 1600 and registered among beacons 1200 pre-stored in a storage unit, from a network administrator, and match and register the received beacon 1200 and the AP 1600. For another example, the server 1800 may receive at least one of the identifier, MAC address, and authentication information of a beacon 1200, which is to be matched to the AP 1600 and registered, from a network administrator, and match and register the AP 1600 and the beacon 1200.

The beacon 1200 may receive authentication information from a network administrator and create a beacon message on the basis of the inputted authentication information in operation S120.

The beacon 1200 may store authentication information received from a network administrator in an additional storage unit and create a beacon message on the basis of the inputted authentication information. The beacon 1200 may create a beacon message in a predetermined data structure on the basis of authentication information.

The beacon 1200 may transmit the created beacon message to the outside in operation S130.

The beacon 1200 may transmit a created beacon message to the outside through a short-range communication method, transmit a created beacon message to a connected terminal 1400 through an Ad-hoc network method, or transmit a created beacon message to the outside without a connection (for example, pairing) to an additional terminal 1400. That is, the beacon 1200 may transmit a beacon message, which is created by only the terminal 1400 in a connected network, through a short-range communication method, and transmit a created beacon message to the outside in order to allow a plurality of unspecified terminals 1400 to receive the beacon message.

The terminal 1400 may obtain authentication information from the received beacon message in operation S230.

The terminal 1400 may check a data structure of the received beacon message and obtain authentication information from the received beacon message. For example, the terminal 1400 may check the data structure of the received beacon message through a program pre-stored in an additional storage unit and obtain authentication information from the received beacon message.

The terminal 1400 may request access information from the server 1800 in operation S240.

The terminal 1400 may transmit authentication information and the MAC address of the terminal 1400 to the server 1800 in order to request the transmission of access information corresponding to the authentication information.

The terminal 1400 may connect to the server 1800 through long-range wireless communication, and transmit authentication information and the MAC address of the terminal 1400 to the server 1800 through the long-range wireless communication.

The server 1800 may check access information received from the terminal 1400 in operation S250.

The server 1800 may receive authentication information and the MAC address of the terminal 1400, from the terminal 1400. The server 1800 may register the MAC address of the terminal 1400 received from the terminal 1400. For example, the server 1800 may match and store the MAC address of the terminal 1400 received from the terminal 1400 and the AP 1600 corresponding to the authentication information and at this point, the server 1800 may store a date and time of receiving the MAC address of the terminal 1400 and the terminal 1400 together.

The server 1800 may determine whether there is access information corresponding to the authentication information received from the terminal 1400.

If there is no access information corresponding to the authentication information received from the terminal 1400, the server 1800 may notify the terminal 1400 that there is no access information corresponding to the authentication information.

The server 1800 may transmit access information to the terminal 1400 in operation S260.

If there is access information corresponding to the authentication information received from the terminal 1400, the server 1800 may transmit access information corresponding to the received authentication information to the terminal 1400.

The terminal 1400 may transmit the access information to the AP 1600 in order to request connection in operation S150.

The terminal 1400 may transmit the access information received from the server 1800 to the AP 1600 in order to request connection.

The AP 1600 may determine the validity of the access information transmitted from the terminal 1400 in order to authenticate it in operation S160.

The AP 1600 may receive the access information from the terminal 1400 and determine the validity of the received access information. Herein, the validity determination of the received access information is to determine whether the received access information is identical to access information pre-stored in the AP 1600. When the received access information is identical to the access information pre-stored in the AP 1600, it is determined that the received access information is valid and when the received access information is not identical to the access information pre-stored in the AP 1600, it is determined that the received access information is not valid.

When the received access information is not valid based on a validity determination result, the AP 1600 may notify the terminal 1400 that the transmitted access information is not valid.

The AP 1600 may allocate an IP that the terminal 1400 is to access in operation S170.

When the received access information is valid based on a validity determination result, the AP 1600 may allocate an IP that the terminal 1400 is to access and transmit information corresponding to an access IP allocated to the terminal 1400, to the terminal 1400.

The terminal 1400 may access the allocated IP in order to connect to a communication network connected to the AP 1600 in operation S180.

The terminal 1400 may access the allocated IP in order to connect to a communication network connected to the AP 1600 and transmit/receive data.

Figure 6:
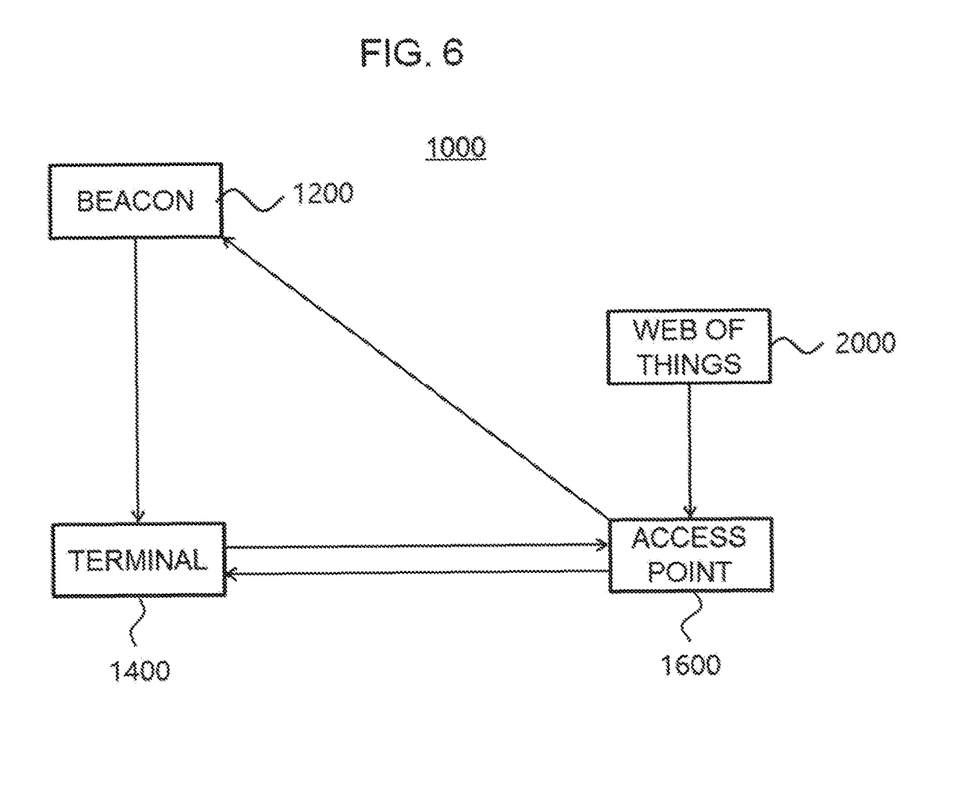
FIG. 6 is a view illustrating a configuration of a network system according to a third embodiment of the present invention.

Hereinafter, a network system 10000 according to a third embodiment of the present invention is described.

Compared to the network system 1000 according to the first embodiment of the present invention, the network system 1000 according to the third embodiment of the present invention further includes a web of things 2000 and operations of the beacon message creation of the beacon 1200 and the connection request of the terminal 1400 are identical. Accordingly, in describing the network system 1000 according to the third embodiment of the present invention, like reference numerals may refer to like elements and overlapping contents may be omitted with respect to the network system 1000 of the first embodiment of the present invention.

FIG. 6 is a view illustrating a configuration of a network system 1000 according to a third embodiment of the present invention.

Referring to FIG. 6, the network system 1000 according to the third embodiment of the present invention may include a beacon 1200, a terminal 1400, an AP 1600, and a web of things 2000.

The beacon 1200 may receive access information from the AP 1600 and transmit a beacon message created based on the received access information through a first short-range communication method, and the terminal 1400 may obtain access information from the beacon message and transmit the obtained access information to the AP 1600 in order to request connection. Additionally, the AP 1600 may connect the terminal 1400 that requests connection to a communication network\and the web of things 2000 may transmit access information to the AP 1600.

The beacon 1200 may create a beacon message based on the access information received from the AP 1600 and transmit the created beacon message to the outside. Herein, the access information may be a random number corresponding to at least one of an AP identifier such as an SSID for identifying the AP 1600 and a password.

The beacon 1200 may register the access information received from the AP 1600. Herein, the access information registration may store authentication information in an additional storage unit (not shown) in the beacon 1200.

The beacon 1200 may create a beacon message according to a data structure on the basis of the registered access information.

The beacon 1200 may transmit the created beacon message to the outside.

The terminal 1400 may receive a beacon message transmitted from the beacon 1200, and obtain access information from the received beacon message. The terminal 1400 may transmit the authentication information and a MAC address to the server 1800 in order to request access information and transmit the access information received from the server 1800, to the AP 1600 in order to request connection.

The terminal 1400 may receive a beacon message transmitted from the beacon 1200, and obtain access information from the received beacon message. Additionally, the terminal 1400 may request connection from the AP 1600 in the access information obtained from the beacon message.

The terminal 1400 may include a short-range wireless communication unit (not shown) for receiving a beacon message from the beacon 1200 and a second short-range wireless communication unit (not shown) for connecting to the AP 1600.

When the connection request to the AP 1600 is accepted, the terminal 1400 may access the AP 1600 through an IP that the AP 1600 allocates to the terminal 1400, and the terminal 1400 may be connected to the AP 1600 through the accessed IP to connect to a communication network connected to the AP 1600.

The AP 1600 may receive access information from the web of things 2000 in connection to the web of things 2000 and deliver the access information to the beacon 1200. Additionally, the AP 1600 may receive a connection request from the terminal 1400 and then determine whether connection information transmitted when the terminal 1400 requests the connection is valid. When the connection information is valid, the AP 1600 may allocate an IP that the terminal 1400 is to access so as to connect the terminal 1400 to a communication network connected to the AP 1600. Herein, the AP 1600 may further include a short-range wireless communication unit (not shown) for performing the same short-range wireless communication as the beacon 1200 in order to deliver the access information to the beacon 1200.

The AP 1600 may receive access information including an AP identifier such as an SSID for identifying the AP 1600 and a password corresponding to the AP identifier, from the web of things 2000. The AP 1600 may store and set the received access information in an additional storage unit (not shown) and update predetermined access information with the received access information.

When receiving a connection request from the terminal 1400, the AP 1600 may compare access information transmitted when the terminal 1400 requests the connection with access information set in the AP 1600 in order to determine whether the access information transmitted from the terminal 1400 is valid. When the access information transmitted from the terminal 1400 is valid based on a determination result, the AP 1600 may allocate an IP that the terminal 1400 is to access in order to transmit information on the IP to the terminal 1400 and connect the terminal 1400 to a communication network connected to the AP 1600 through the IP allocated to the terminal 1400.

The web of things 2000 may receive access information from a network administrator and transmit the received access information to the AP 1600. Herein, the web of things 200 may be a web where several electronic devices are connected via internet. For example, the web of things 2000 may be implemented with a device for managing web and also may be implemented with a program executed on a computer and a server. Accordingly, the web of things 2000 may be connected to at least one AP 1600.

The web of things 2000 may provide a list of APs 1600 connected to the web of things 2000 in order to allow a network administrator to select an AP 1600 where access information is to be inputted, and when the network administrator selects an AP 1600 and inputs access information, transmit the inputted access information to the selected AP 1600.

The web of things 2000, for example, is a logical program existing on web to allow a physical AP to access through web, and for a more specific example, may include a program executed on a device, a computer, and a server, which are implemented through all access methods through web, including managing an AP through web.

In describing a network system according to the third embodiment of the present invention, although it is described that the beacon 1200 and the AP 1600 are separated, the beacon 1200 and the AP 1600 may be provided as one component. For example, without providing an additional beacon 1200, the AP 1600 may include the beacon 1200 and in this case, the AP 1600 may perform an operation of the beacon 1200 in addition to its original function.

Figure 7:
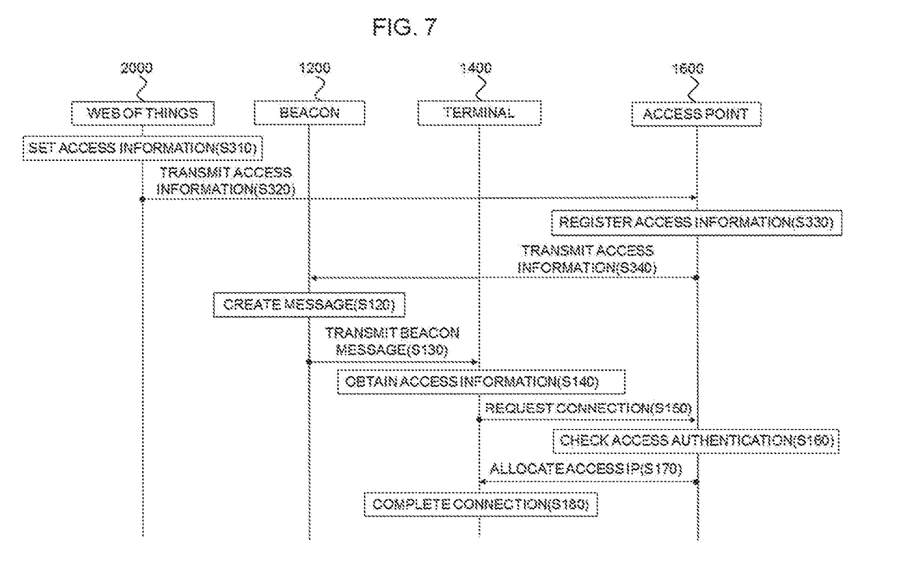
FIG. 7 is a flowchart illustrating a network connecting method according to a third embodiment of the present invention.

FIG. 7 is a flowchart illustrating a network connecting method according to a third embodiment of the present invention.

Referring to FIG. 7, the network connecting method according to the third embodiment of the present invention may include setting access information in operation S310, transmitting the access information in operation S320, registering the access information in operation S330, delivering the access information in operation S340, creating a beacon message in operation S120, transmitting the beacon message in operation S130, obtaining the access information in operation S140, requesting connection in operation S150, checking access authentication for the access information in operation S160, allocating an access IP in operation S170, and completing the connection in operation S180.

The web of things 2000 may set access information in operation S310.

The web of things 2000 may receive access information from a network administrator, and store and set the received access information in an additional storage unit. Additionally, the web of things 2000 may match and store the access information from a network administrator and an AP 1600 selected by the network administrator.

The web of things 2000 may transmit the access information to the AP 1600 in operation S320.

The web of things 2000 may transmit the set access information to the AP 1600 selected by the network administrator.

The AP 1600 may register the access information in operation S330.

The AP 1600 may receive the access information from the web of things 2000. The AP 1600 may store and set the received access information in an additional storage unit (not shown) and update predetermined access information with the received access information.

The AP 1600 may deliver the access information to the beacon 1200 in operation S340.

The AP 1600 may deliver the access information through a short-range communication method that is available for connection to the beacon 1200.

The beacon 1200 may receive access information from a network administrator and create a beacon message on the basis of the received access information in operation S120.

The beacon 1200 may store access information received from a network administrator in an additional storage unit and create a beacon message on the basis of the received authentication information. The beacon 1200 may create a beacon message in a predetermined data structure on the basis of access information.

The beacon 1200 may transmit the created beacon message to the outside in operation S130.

The beacon 1200 may transmit a created beacon message to the outside through a short-range communication method, transmit a created beacon message to the connected terminal 1400 through an Ad-hoc network method, or transmit a created beacon message to the outside without a connection (for example, pairing) to the additional terminal 1400. That is, the beacon 1200 may transmit a beacon message, which is created by only the terminal 1400 in a connected network, through a short-range communication method, and transmit a created beacon message to the outside in order to allow a plurality of unspecified terminals 1400 to receive the beacon message.

Although it is described above that the beacon 1200 creates a beacon message on the basis of an AP identifier and a password, the beacon 1200 may create a beacon message on the basis of only a password. For example, the beacon 1200 may create a UUID to correspond to a store name and create Major and Minor to correspond to a password.

The terminal 1400 may obtain access information from the received beacon message in operation S140.

The terminal 1400 may check a data structure of the received beacon message and obtain an AP identifier and a password from the received beacon message.

The terminal 1400 may check the data structure of the received beacon message through a program pre-stored in an additional storage unit and obtain access information such as an AP identifier and a password from the received beacon message.

The terminal 1400 may transmit the access information to the AP 1600 in order to request connection in operation S150.

The terminal 1400 may transmit the access information extracted from the received beacon message to the AP 1600 in order to request connection.

The AP 1600 may determine the validity of the access information transmitted from the terminal 1400 in order to authenticate it in operation S160.

The AP 1600 may receive the access information from the terminal 1400 and determine the validity of the received access information. Herein, the validity determination of the received access information is to determine whether the received access information is identical to access information pre-stored in the AP 1600. When the received access information is identical to the access information pre-stored in the AP 1600, it is determined that the received access information is valid and when the received access information is not identical to the access information pre-stored in the AP 1600, it is determined that the received access information is not valid.

When the received access information is not valid based on a validity determination result, the AP 1600 may notify the terminal 1400 that the transmitted access information is not valid.

The AP 1600 may allocate an IP that the terminal 1400 is to access in operation S170.

When the received access information is valid based on a validity determination result, the AP 1600 may allocate an IP that the terminal 1400 is to access and transmit information corresponding to an access IP allocated to the terminal 1400, to the terminal 1400.

The terminal 1400 may access the allocated IP in order to connect to a communication network connected to the AP 1600 in operation S180.

The terminal 1400 may access the allocated IP in order to connect to a communication network connected to the AP 1600 and transmit/receive data.

According to the present invention, a network connecting method allows a terminal to automatically connect to network by obtaining information necessary for network connection through short-range communication.

Additionally, according to the present invention, even when an administrator replaces an SSID and a password periodically, a user may use them safely and transparently and protect internal information by hiding the SSID.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A network connecting method comprising:
   storing, by a server, a data table that matches a first information on an access point (AP) with a second information related to a beacon, wherein the access point (AP) and the beacon are configured to perform short-range wireless communications of different standards;
   transmitting, by the beacon, a beacon message based on an authentication information;
   obtaining, by a terminal, the authentication information based on the beacon message;
   transmitting, by the terminal, a request message including the authentication information to the server through long-range wireless communication;
   obtaining, by the server, based on the data table, an access information corresponding to the authentication information transmitted from the terminal;
   transmitting a response message including the access information to the terminal; and
   accessing, by the terminal that receives the response message, the AP by using the access information.

2. The method of claim 1, wherein the beacon transmits the beacon message to the terminal connected to an ad-hoc type network.

3. The method of claim 1, wherein the beacon transmits the beacon message through one-way communication.

4. The method of claim 1, wherein the beacon obtains, as the authentication information, a random number formed of at least one of a string and a number, which are generated based on the access information, from a stored program.

5. The method of claim 1, wherein the server determines whether the beacon corresponding to the authentication information received from the terminal and when the beacon corresponding to the authentication information, searches for the access information corresponding to the AP which stored matching the beacon.

6. The method of claim 1, wherein the access information comprises at least one of a Service Set Identifier (SSID) for identifying the AP and a password.

7. The method of claim 1, wherein the short-range wireless communication is at least one of Bluetooth, Bluetooth LE (BTLE), NFC, ZigBee, visible light communication, Wi-fi and RFID.

8. The method of claim 7, wherein the AP performs Wi-Fi and the beacon performs short-range wireless communication of at least one of Bluetooth, BTLE, NFC, ZigBee, visible light communication, and RFID.

9. The method of claim 1, wherein the beacon creates and transmits the beacon message in a data structure used for BTLE.

10. The method of claim 9, wherein the beacon modifies a capacity division of a data structure used for BTLE to crate and transmit the beacon message.

11. A network connecting method comprising:
    setting access information on an AP connected based on the web of things;
    transmitting the access information to the AP;
    registering the access information;
    transmitting, by the AP, the access information to the beacon through short-range wireless communication having the same standard as a beacon;
    creating, by the beacon, a beacon message on the basis of the access information and transmitting the beacon message through a short-range wireless communication method;
    obtaining, by the terminal, the access information from the beacon message; and
    transmitting, by the terminal, the access information to the AP to access to the AP.

12. A non-transitory computer readable recording medium having a program for implementing claim 1.

13. A network system comprising:
    a beacon configured to create a beacon message and transmit the created beacon message using a short-range wireless communication method, wherein the beacon message includes an authentication information;
    a server configured to register access information transmitted from an AP, receive an authentication information that a terminal obtains from the beacon message, and transmit the access information corresponding to the received authentication information to the terminal; and
    an AP configured to transmit the access information to the server, determine a validity of the access information transmitted from the terminal, and when the access information is valid, allocate an IP that the terminal is to access in order to transmit IP information to the terminal.

14. The network system of claim 13, wherein the server receives a Mac address of terminal and registers the Mac address.

15. The network system of claim 14, wherein the server stores at least one of a date and time of registering the MAC address and a date and time of transmitting the access information to the terminal.

16. The network system of claim 15, wherein when a predetermined time elapses after the time of registering the MAC address of the terminal and the data and time of transmitting the access information to the terminal, the server transmits the MAC address of the terminal to the AP.

17. The network system of claim 16, wherein the AP receives the MAC address from the server and releases a connection to the terminal corresponding to the received MAC address.

18. A network system comprising:
a beacon configured to create a beacon on the basis of an access information received from an AP and transmit the created beacon message using a short-range wireless communication method; and
an AP configured to receive the access information from the web of things to register the access information, transmit the access information to the beacon, when a terminal requests connection by transmitting the access information obtained from the beacon message, determine a validity of the access information, and when the access information is valid, allocate an IP that the terminal is to access to transmit IP information to the terminal.

* * * * *